(12) United States Patent
McRae

(10) Patent No.: US 9,069,596 B2
(45) Date of Patent: Jun. 30, 2015

(54) HYPERVISOR FILE SYSTEM

(75) Inventor: Scott M. McRae, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 12/620,090

(22) Filed: Nov. 17, 2009

(65) Prior Publication Data

US 2011/0119669 A1   May 19, 2011

(51) Int. Cl.
  *G06F 9/455* (2006.01)
  *G06F 9/46* (2006.01)
  *G06F 9/44* (2006.01)

(52) U.S. Cl.
  CPC .. *G06F 9/45558* (2013.01); *G06F 2009/45579* (2013.01)

(58) Field of Classification Search
  CPC .................. G06F 9/45558; G06F 2009/45579
  See application file for complete search history.

(56) References Cited

U.S. PATENT DOCUMENTS

| 5,655,154 | A | 8/1997 | Jain et al. | |
|---|---|---|---|---|
| 7,337,171 | B2 | 2/2008 | Gimpl et al. | |
| 7,434,003 | B2 | 10/2008 | Oney et al. | |
| 2008/0148300 | A1 | 6/2008 | Archer et al. | |
| 2008/0178290 | A1* | 7/2008 | Besch et al. | 726/22 |
| 2008/0244577 | A1 | 10/2008 | Le et al. | |
| 2010/0162238 | A1* | 6/2010 | Warfield | 718/1 |

OTHER PUBLICATIONS

Dor Laor; KVM PV Devices; 20 pages; Oct. 29, 2007; http://researchweb.watson.ibm.com/haifa/Workshops/systor2007/program_vw.html.*
Cook, R., "Pane Relief: Virtual Operating Systems," InformIT network, May 12, 2006, 2 pages.
Barham, P. et al., "Xen and the Art of Virtualization," SOSP'03, Oct. 19-22, 2003, Bolton Landing, New York, USA, Copyright 2003 ACM 1-58113-757-5/03/0010, 14 pages.

* cited by examiner

*Primary Examiner* — H S Sough
*Assistant Examiner* — Kimberly Jordan
(74) *Attorney, Agent, or Firm* — William E. Schiesser; Keohane & D'Alessandro PLLC; Maxine L. Barasch

(57) ABSTRACT

In general, the present invention provides a computer-implemented hypervisor file system (HVFS) comprising (among other things): a HVFS Manager, a Source File System Implementation, Hypervisor API, and HVFS Driver implemented in conjunction with a set (e.g., one or more) of virtual machines. Running a virtual machine on top of complex software systems like hypervisors allows the virtual machine to be presented with virtual storage devices which operate in the file system abstraction layer, instead of the block device layer traditionally presented by hardware. Doing so allows the file system abstraction to be implemented in the hypervisor, and not in the individual virtual machines, giving the hypervisor much greater access and control over the file system elements used by virtual machines, as well as giving it new capabilities such as sharing file system elements across virtual machines.

17 Claims, 3 Drawing Sheets

HYPERVISOR FILE SYSTEM

FIELD OF THE INVENTION

The present invention generally relates to file storage and retrieval. Specifically, the present invention relates to a Hypervisor File System (HVFS).

BACKGROUND OF THE INVENTION

As computing power has continued to increase, the industry has started using virtualization technology to gain better utilization of hardware resources while allowing for isolated management on entire operating systems running on the same system. As companies have started migration of their Information Technology (IT) infrastructure onto virtual platforms, they have generally found the isolation of virtual machines to be beneficial, but have also found some drawbacks.

Many common problems such as backup and anti-virus could previously be solved by a single software component being installed on the physical server, often because they could provide their solution to the entire file system of the machine. With virtualization, however, each virtual machine manages its own isolated virtual resources, so these solutions have to be installed on each virtual machine, increasing management complexity and cost. Ideally, the virtual machine platform could provide some software with the ability to access resources across all virtual machines to provide common services while maintaining the majority of isolation.

With the specific resource in consideration here, the file system, this is difficult to achieve because virtual machine platforms usually provide storage to virtual machines in the form of virtual storage devices that mimic the way traditional storage devices work, leaving implementation of the file system abstraction to the file system drivers that run as part of the operating system kernel inside each virtual machine. As such, all known solutions fail to address current needs.

SUMMARY OF THE INVENTION

In general, the present invention provides a computer-implemented hypervisor file system (HVFS), comprising: (among other things) a HVFS Manager, a Source File System Implementation, Hypervisor API, and HVFS Driver implemented in conjunction with a set (e.g., one or more) of virtual machines. Running a virtual machine on top of complex software systems like hypervisors allows the virtual machine to be presented with virtual storage devices which operate in the file system abstraction layer, instead of the block device layer traditionally presented by hardware. Doing so allows the file system abstraction to be implemented in the hypervisor, and not in the individual virtual machines, giving the hypervisor much greater access and control over the file system elements used by virtual machines, as well as giving it new capabilities such as sharing file system elements across virtual machines.

A first aspect of the present invention provides a computer-implemented hypervisor file system (HVFS), comprising: a HVFS manager being configured to receive file system requests and to service the file system requests based on at least one of: a configuration and at least one source file system implementation; a set of HVFS drivers implemented for a set of operating system kernels, the set of HVFS drivers being configured to forward file system requests to the HVFS manager; and a set of HVFS Application Programming Interfaces (APIs) configured to receive the file system requests from the set of HVFS drivers and to forward the file system requests to the HVFS manager.

A second aspect of the present invention provides a computer-implemented hypervisor storage method, comprising: receiving a file system request at an HVFS driver from a requestor; sending the file system request to a HVFS manager via a HVFS API; servicing the file system request with the HVFS manager based on at least one of the following: a configuration, or at least one source file system implementation; and returning a response to the request to the requestor via the HVFS API and the HVFS driver.

A third aspect of the present invention provides a computer readable storage medium containing a program product for hypervisor storage, the computer readable storage medium comprising program code for causing a computer to: receive a file system request at an HVFS driver from a requestor; send the file system request to a HVFS manager via a HVFS API; service the file system request with the HVFS manager based on at least one of the following: a configuration, or at least one source file system implementation; and return a response to the request to the requestor via the HVFS API and the HVFS driver.

A fourth aspect of the present invention provides a method for deploying a hypervisor file system, comprising: deploying a computer infrastructure being operable to: receive a file system request at an HVFS driver from a requestor; send the file system request to a HVFS manager via a HVFS API; service the file system request with the HVFS manager based on at least one of the following: a configuration, or at least one source file system implementation; and return a response to the request to the requestor via the HVFS API and the HVFS driver.

A fifth aspect of the present invention provides a hypervisor-based data processing system, comprising: a memory medium comprising instructions; a bus coupled to the memory medium; and a processor coupled to the bus that when executing the instructions causes the hyper-visor-based data processing system to: receive a file system request at an HVFS driver from a requestor; send the file system request to a HVFS manager via a HVFS API; service the file system request with the HVFS manager based on at least one of the following: a configuration, or at least one source file system implementation; and return a response to the request to the requestor via the HVFS API and the HVFS driver.

BRIEF DESCRIPTION OF THE INVENTION

These and other features of this invention will be more readily understood from the following detailed description of the various aspects of the invention taken in conjunction with the accompanying drawings in which.

Figure 1:
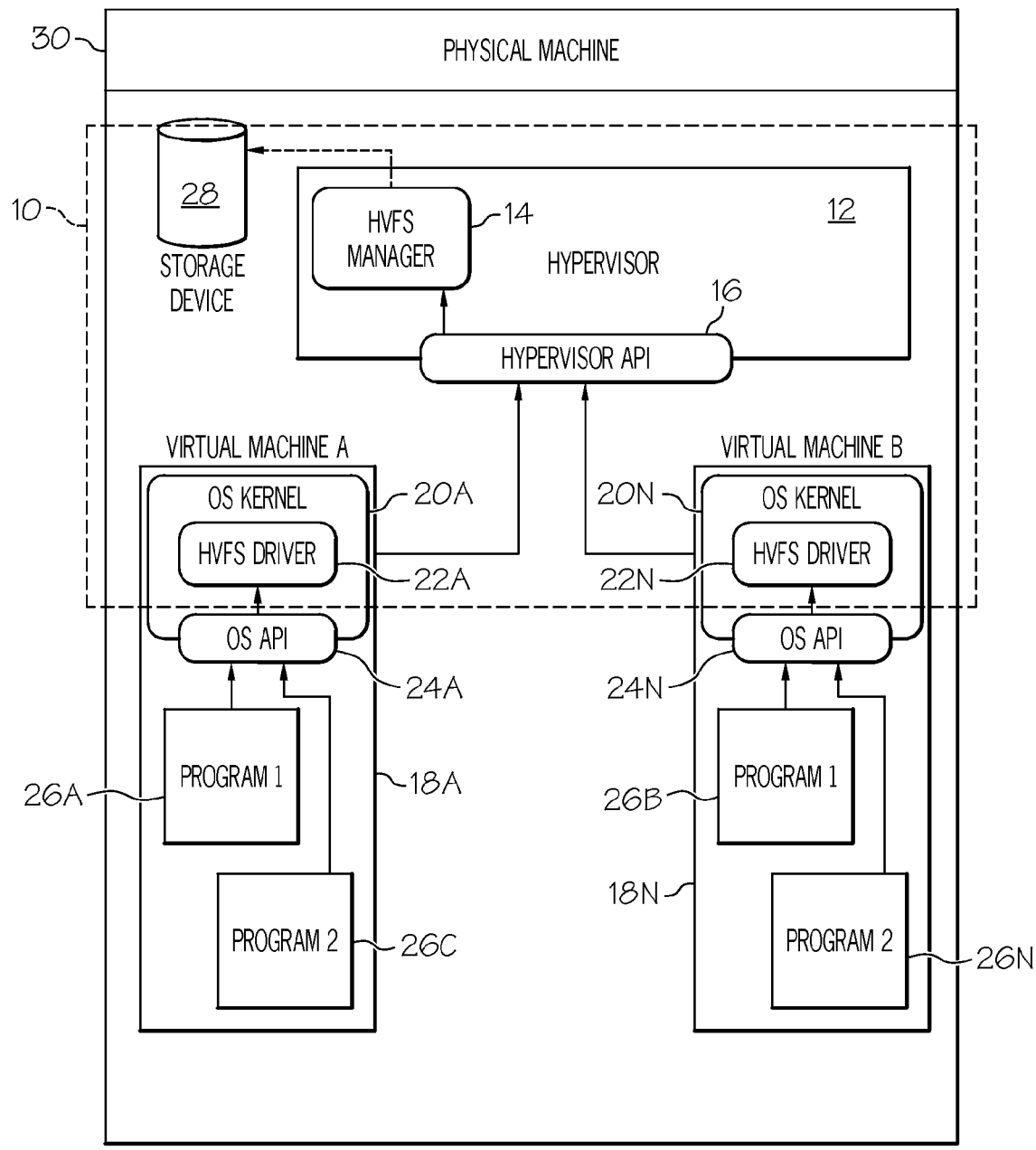
FIG. 1 shows a block diagram of a HVFS according to an aspect of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections I. General Description
II. Computerized Implementation I. General Description As indicated above, the present invention provides a computer-implemented hypervisor file system (HVFS) comprising (among other things) a HVFS Manager, a Source File System Implementation, Hypervisor API, and HVFS Driver implemented in conjunction with a set (e.g., one or more) of virtual machines. Running a virtual machine on top of complex software systems like hypervisors allows the virtual machine to be presented with virtual storage devices which operate in the file system abstraction layer, instead of the block device layer traditionally presented by hardware. Doing so allows the file system abstraction to be implemented in the hypervisor, and not in the individual virtual machines, giving the hypervisor much greater access and control over the file system elements used by virtual machines, as well as giving it new capabilities such as sharing file system elements across virtual machines.

By implementing the file systems used by virtual machines under the present invention, services such as backups and anti-malware solutions can be provided to all virtual machines on a virtual machine platform transparently and ubiquitously. The implementation does not need to depend on special configuration or access rights in the virtual machines and does not need to depend on them being powered on as is the case with Network File Systems. Backups can be targeted on specific file system objects, can occur while the virtual machine is active, and can even be triggered by file system events such as changes to certain files, unlike using Virtual Storage Device Images. Anti-malware solutions can be given access to file system elements easily and can be triggered synchronously on file system events, unlike with Monitoring File System Drivers.

Referring now to FIG. 1, a diagram of a HVFS 10 according to the present invention is shown. In the diagram, solid arrow lines represent the flow of file system requests such as reading from or writing to a file, listing the contents of a directory, etc. Dashed arrows represent the flow of storage device requests such as reading from or writing to a specific block of the storage device. As depicted, elements of the HVFS 10 comprise one or more of the following: HVFS manager 14, a set (i.e., at least one) of HVFS API interfaces 16, and a set of HVFS drivers 22A-N. As depicted, HVFS manager 14 and HVFS API interfaces 16 can be implemented within hypervisor block 12. This type of compartmentalization of such components is only one possible way of implementing the present invention. FIG. 1 further shows virtual machines 18A-N, a set operating system (OS) kernels 20A-N, a set of operating system (OS) APIs 24A-N, a set of programs 26A-N, and one or more storage devices such as storage device/unit 28. Moreover, the components shown in FIG. 1 are typically implemented within a physical machine 30 (e.g., a computer). It is understood that although not shown in FIG. 1, physical machine 30 will likely further include other hardware and/or software components (e.g., a processor, memory, a bus, etc.). Some of these components will be described in conjunction with FIG. 2 below.

Regardless, the HVFS components of the present invention generally have the following forms and functions:

HVFS Manager 14—a module that executes as part of the hypervisor block 12, receives requests from HVFS Drivers 22A-N running inside the operating system kernels 18A-N of virtual machines and processes/services the requests based on configuration and one or more source file system implementations.

Source File System Implementation/Storage device 28—can be fulfilled by any file system implementation; runs alongside the HVFS Manager 14. Although shown external to hypervisor 12, this comment can be run in hypervisor 14.

Hypervisor API Extension(s) 16A-N—additional API calls in the Hypervisor API that can be used to make file system requests to the HVFS Manager.

HVFS Driver(s) 22A-N—a file system driver implemented for each operating system kernel 20A-N supported that forwards file system requests received from the operating system and user programs 26A-N to the HVFS Manager 14 via/through the HVFS API Extension(s) 16A-N.

In a typical embodiment when file system request (hereinafter "request") is request by OS API(S)(s) 24A-N from program(s) 26A-N. The request is communicated to HVFS manager 14 via HVFS driver(s) 22A-B and HVFS API(S) 16. HVFS manager 14 will then attempt to fulfill the request by accessing file storage device(s) 28. A response (e.g., whether or not the request information was obtained) will then be sent back to the requesting program(s) 26A-N by HVFS manager 14 (e.g., via HVFS API(S) 16, HVFS driver(s) 22A-N, OS API(S) 24A-N.

One difference between a file system implementation on a virtual machine platform using the HVFS and current common implementations is that the translation from file system requests to storage device requests occurs in the hypervisor layer under HVFS, not in the file system drivers that run as part of the operating system kernels inside the virtual machines.

Note that the invention does not specify how the source file system is implemented. Any current file system implementation could be used as long as it can be accessed by the HVFS Manager, including traditional block device file systems, network file systems, and in-memory file systems.

Services implemented in the hypervisor layer can easily gain access to this same file system source, and thereby gain access to the file systems used by hosted virtual machines without any interaction with software on those virtual machines. This allows for ubiquitous and transparent deployment of services in the virtual machine platform layer.

II. Computerized Implementation

Figure 2:
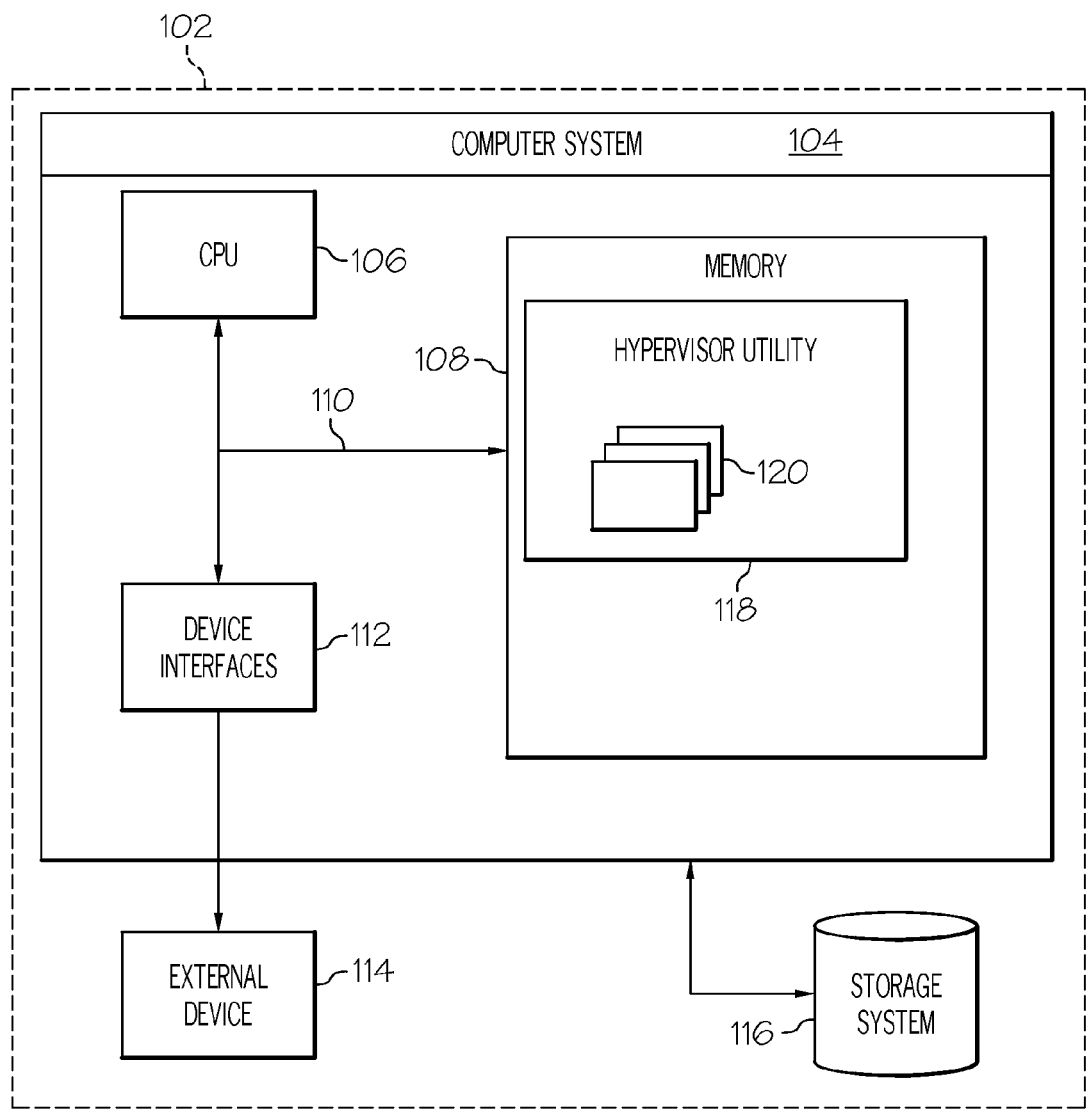
FIG. 2 shows a more specific computerized implementation according to an aspect of the present invention.

Referring now to FIG. 2, a computerized implementation 100 of the present invention is shown. As depicted, implementation 100 includes computer system 104 (e.g., physical machine 30) deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

As shown, computer system 104 includes a processing unit 106, a memory 108, a bus 110, and device interfaces 112. Further, computer system 104 is shown communicating with one or more external devices 106 that communicate with bus via device interfaces. In general, processing unit 106 executes computer program code, such as search term hypervisor utility 118, which is stored in memory 108 and/or storage system 116. While executing computer program code, processing unit 106 can read and/or write data to/from memory 108, storage system 116, and/or device interfaces 112. Bus 110 provides a communication link between each of the components in computer system 104. Although not shown, computer system 104 could also include I/O interfaces that communicate with: one or more external devices 114 such as a kiosk, a checkout station, a keyboard, a pointing device, a display, etc.); one or more devices that enable a user to interact with computer system 104; and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various processes of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, device interfaces 112 can comprise any module for exchanging information with one or more external devices 114. Still further, it is understood that one or more additional components (e.g., system software, math co-processing unit, etc.) not shown in FIG. 2 can be included in computer system 104.

Storage system 116 can be any type of system capable of providing storage for information under the present invention. To this extent, storage system 116 could include one or more storage devices (e.g., storage device 28 of FIG. 1), such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Figure 3:
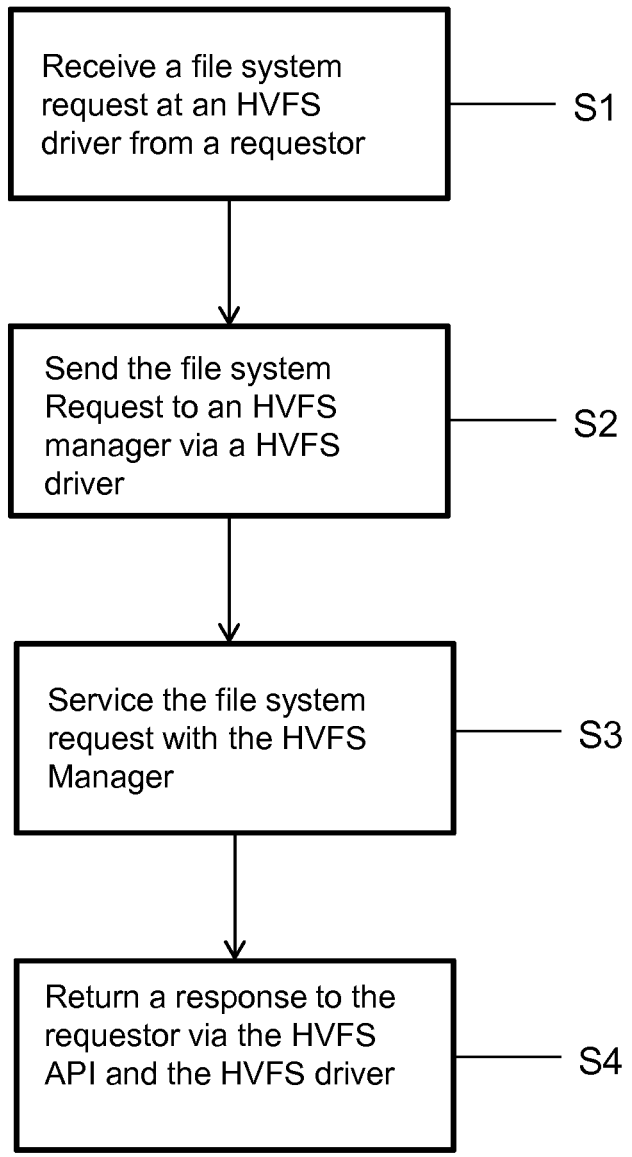
FIG. 3 shows a method flow diagram according to an aspect of the present invention.

Shown in memory 108 of computer system 104 is search term hypervisor utility 118, which includes a set of modules 120. Set of modules 120 generally provide all functions of the present invention as described herein. Along these lines, set of modules 120 should be understood as including components of FIG. 1. As shown in conjunction with FIGS. 2 and 3, set of modules 120 is configured for (among other things): receiving a file system request at an HVFS driver from a requestor in step S1; sending the file system request to a HVFS manager via a HVFS API in step S2; servicing (e.g., by accessing storage unit 116) the file system request with the HVFS manager based on at least one of the following: a configuration, or at least one source file system implementation in step S3; and/or returning a response to the request to the requestor via the HVFS API and the HVFS driver in step S4.

While shown and described herein as a hypervisor file system, it is understood that the invention further provides various alternative embodiments. For example, in one embodiment, the invention provides a computer-readable/useable storage medium that includes computer program code to enable a computer infrastructure to provide hypervisor functionality as discussed herein. To this extent, the computer-readable/useable storage medium includes program code that implements each of the various processes of the invention. It is understood that the terms computer-readable storage medium or computer useable storage medium comprise one or more of any type of physical embodiment of the program code. In particular, the computer-readable/useable storage medium can comprise program code embodied on one or more portable storage articles of manufacture (e.g., a compact disc, a magnetic disk, a tape, etc.), on one or more data storage portions of a computing device, such as memory 108 (FIG. 2) and/or storage system 116 (FIG. 2) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide hypervisor functionality. In this case, the service provider can create, maintain, support, etc., a computer infrastructure, such as computer infrastructure 102 (FIG. 2) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing hypervisor functionality. In this case, a computer infrastructure, such as computer infrastructure 102 (FIG. 2), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 2), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic device system/driver for a particular computing and/or device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. At least one computing device comprising a processor, a memory, and a computer-implemented hypervisor file system (HVFS), the computer implemented HVFS comprising:
    a HVFS manager being configured to target, by the at least one computing device, predetermined file system objects from a first virtual machine and predetermined file system objects from a second virtual machine for storage in a computer storage device located within a hypervisor of the HVFS;
    the HVFS manager being further configured to in response to a predetermined file system event, receive by the at least one computing device, at a first set of hypervisor file system (HVFS) drivers located in an operating system (OS) kernel of an operating system of the first virtual machine, from a first requestor, a first file system request, the first file system request relating to at least one of the predetermined file system objects from the first virtual machine and to service the first file system request based on at least one of the following: a configuration or at least one source file system implementation of the at least one of the predetermined file system objects from the first virtual machine, the servicing comprising translating the first file system request to a first storage device request, storing the at least one of the predetermined file system objects from the first virtual machine in the computer storage device located within the hypervisor of the HVFS, and providing an anti-malware solution to the at least one of the predetermined file system objects from the first virtual machine;
    the first set of HVFS drivers configured to forward, by the at least one computing device, the first file system request from the first virtual machine to a set of HVFS Application Program Interfaces (APIs);
    the set of HVFS APIs configured to receive the first file system request, by the at least one computing device, from the first set of HVFS drivers, forward the first file system request from the first virtual machine to the HVFS manager, and return a response to the first file system request to the first requestor and the first set of HVFS drivers;
    the HVFS manager being further configured to, in response to the predetermined file system event, receive by the at least one computing device, at a second set of HVFS drivers located in an OS kernel of an operating system of the second virtual machine, from a second requestor, a second file system request, the second file system request relating to at least one of the predetermined file system objects from the second virtual machine and to service the second file system request based on at least one of the following: a configuration or at least one source file system implementation of the at least one of the predetermined file system objects from the second virtual machine, the servicing comprising translating the second file system request to a second storage device request, storing the at least one of the predetermined file system objects from the second virtual machine, and providing the anti-malware solution to the at least one of the predetermined file system objects from the second virtual machine;
    the second set of HVFS drivers being configured to forward, by the at least one computing device, the second file system request from the second virtual machine to the set of HVFS APIs; and
    the set of HVFS APIs further configured to receive the second file system request, by the at least one computing device, from the second set of HVFS drivers, forward the file system requests to the HVFS manager, and return a response to the second file system request to the second requestor and the second set of HVFS drivers.

2. The at least one computing device of claim 1, the first set of HVFS drivers being a set of file system drivers.

3. The at least one computing device of claim 1, the first set of HVFS drivers running inside the operating system kernels of virtual machines.

4. The at least one computing device of claim 1, the file system requests being received by the set of HVFS drivers from at least one of: user programs or an operating system of a computer in conjunction with which the HVFS system is being implemented.

5. The at least one computing device of claim 1, the HVFS manager, the sets of HVFS drivers, and the set of HVFS APIs being implemented in conjunction with the at least one computing device.

6. The at least one computing device of claim 1, the HVFS manager further being configured to communicate, by the at least one computing device, responses to the first file system request to the first set HVFS drivers via the set of HVFS APIs.

7. A computer-implemented hypervisor storage method, comprising:
    targeting predetermined file system objects from a first virtual machine and predetermined file system objects from a second virtual machine for storage in a computer storage device located within a hypervisor of a hypervisor file system (HVFS);
    detecting a predetermined file system event;
    in response to the predetermined file system event, receiving at a first set of HVFS drivers located in an operating system (OS) kernel of an operating system of the first virtual machine, from a first requestor, a first file system request, the first file system request relating to at least one of the predetermined file system objects from the first virtual machine;
    sending the first file system request to a HVFS manager via a set of HVFS application program interfaces (APIs);
    servicing the first file system request with the HVFS manager based on at least one of the following: a configuration or at least one source file system implementation of the at least one of the predetermined file system objects from the first virtual machine, the servicing comprising: translating the first file system request to a first storage device request, storing the at least one of the predetermined file system objects from the first virtual machine in the computer storage device located within the hypervisor of the HVFS, and providing an anti-malware solution to the at least one of the predetermined file system objects from the first virtual machine;

returning a response to the first file system request to the first requestor via the set of HVFS APIs and the first set of HVFS drivers; and in response to the predetermined file system event, receiving at a second set of HVFS drivers located in an operating system (OS) kernel of an operating system of the second virtual machine, from a second requestor, a second file system request, the second file system request relating to at least one of the predetermined file system objects from the second virtual machine;

sending the second file system request to the HVFS manager via the set of HVFS APIs;

servicing the second file system request with the HVFS manager based on at least one of the following: a configuration or at least one source file system implementation of the at least one of the predetermined file system objects from the second virtual machine, the servicing comprising: translating the second file system request to a second storage device request, storing the at least one of the predetermined file system objects from the second virtual machine, and providing the anti-malware solution to the at least one of the predetermined file system objects from the second virtual machine; and returning a response to the second file system request to the second requestor via the set of HVFS APIs and the second set of HVFS drivers.

8. The hypervisor storage method of claim 7, the servicing comprising accessing the computer storage device.

9. The hypervisor storage method of claim 7, the first HVFS driver being implemented within an operating system kernel of a virtual machine.

10. The hypervisor storage method of claim 9, the first virtual machine and the second virtual machine each being implemented within a computer.

11. The hypervisor storage method of claim 7, wherein at least one of the first requestor and the second requestor is a program.

12. A non-transitory computer readable storage medium containing a program product for hypervisor storage, the non-transitory computer readable storage medium comprising program code for causing a computer to:

target predetermined file system objects from a first virtual machine and predetermined file system objects from a second virtual machine for storage in a computer storage device located within a hypervisor of a hypervisor file system (HVFS);

detect a predetermined file system event;

in response to the predetermined file system event, receive at a first set of HVFS drivers located in an operating system (OS) kernel of an operating system of the first virtual machine, from a first requestor, a first file system request, the first file system request relating to at least one of the predetermined file system objects from the first virtual machine;

send the first file system request to a HVFS manager via a set of HVFS application program interfaces (APIs);

service the first file system request with the HVFS manager based on at least one of the following: a configuration or at least one source file system implementation of the at least one of the predetermined file system objects from the first virtual machine, the servicing comprising:

translating the first file system request to a first storage device request, storing the at least one of the predetermined file system objects from the first virtual machine in the computer storage device located within the hypervisor of the HVFS, and providing an anti-malware solution to the at least one of the predetermined file system objects from the first virtual machine;

return a response to the first file system request to the first requestor via the set of HVFS APIs and the first set of HVFS drivers; and in response to the predetermined file system event, receive at a second set of HVFS drivers located in an operating system (OS) kernel of an operating system of the second virtual machine, from a second requestor, a second file system request, the second file system request relating to at least one of the predetermined file system objects from the second virtual machine;

send the second file system request to the HVFS manager via the set of HVFS APIs;

service the second file system request with the HVFS manager based on at least one of the following: a configuration or at least one source file system implementation of the at least one of the predetermined file system objects from the second virtual machine, the servicing comprising: translating the second file system request to a second storage device request, storing the at least one of the predetermined file system objects from the second virtual machine, and providing the anti-malware solution to the at least one of the predetermined file system objects from the second virtual machine; and return a response to the second file system request to the second requestor via the set of HVFS APIs and the second set of HVFS drivers.

13. The non-transitory computer readable storage medium containing the program product of claim 12, the computer readable storage medium further comprising program code for causing the computer to access the computer storage device to service the first file system request and the second file system request.

14. The non-transitory computer readable storage medium containing the program product of claim 12, the virtual machine and the second virtual machine being implemented within a computer.

15. The non-transitory computer readable storage medium containing the program product of claim 12, wherein at least one of the first requestor and the second requestor is a program.

16. A method for deploying a hypervisor file system, comprising:

deploying a computer infrastructure being operable to:

target predetermined file system objects from a first virtual machine and predetermined file system objects from a second virtual machine for storage in a computer storage device located within a hypervisor of a hypervisor file system (HVFS);

detect a predetermined file system event;

in response to the predetermined file system event, receive at a first set of HVFS drivers located in an operating system (OS) kernel of an operating system of the first virtual machine, from a first requestor, a first file system request, the first file system request relating to at least one of the predetermined file system objects from the first virtual machine;

send the first file system request to a HVFS manager via a set of HVFS application program interfaces (APIs);

service the first file system request with the HVFS manager based on at least one of the following: a configuration or at least one source file system implementation of the at least one of the predetermined file system objects from the first virtual machine, the servicing comprising; translating the first file system request to a first storage device request, storing the at least one of the predetermined file system objects from the first virtual machine in the computer storage device located within the hypervisor of the HVFS, and providing an anti-malware solution to the at least one of the predetermined file system objects from the first virtual machine;

return a response to the first file system request to the first requestor via the set of HVFS APIs and the first set of HVFS drivers; and in response to the predetermined file system event, receive at a second set of HVFS drivers located in an operating system (OS) kernel of an operating system of the second virtual machine, from a second requestor, a second file system request, the second file system request relating to at least one of the predetermined file system objects from the second virtual machine;

send the second file system request to the HVFS manager via the set of HVFS APIs;

service the second file system request with the HVFS manager based on at least one of the following: a configuration or at least one source file system implementation of the at least one of the predetermined file system objects from the second virtual machine, the servicing comprising: translating the second file system request to a second storage device request, storing the at least one of the predetermined file system objects from the second virtual machine, and providing the anti-malware solution to the at least one of the predetermined file system objects from the second virtual machine; and return a response to the second file system request to the second requestor via the set of HVFS APIs and the second set of HVFS drivers.

17. A hypervisor-based data processing system, comprising:

a memory medium comprising instructions;

a bus coupled to the memory medium; and a processor coupled to the bus that when executing the instructions causes the hypervisor-based data processing system to:

target predetermined file system objects from a first virtual machine and predetermined file system objects from a second virtual machine for storage in a computer storage device located within a hypervisor of a hypervisor file system (HVFS);

detect a predetermined file system event;

in response to the predetermined file system event, receive at a first set of hypervisor file system (HVFS) drivers located in an operating system (OS) kernel of an operating system of the first virtual machine, from a first requestor, a first file system request, the first file system request relating to at least one of the predetermined file system objects from the first virtual machine;

send the first file system request to a HVFS manager via a set of HVFS application program interfaces (APIs);

service the first file system request with the HVFS manager based on at least one of the following: a configuration or at least one source file system implementation of the at least one of the predetermined file system objects from the first virtual machine, the servicing comprising; translating the first file system request to a first storage device request, storing the at least one of the predetermined file system objects from the first virtual machine, and providing an anti-malware solution to the at least one of the predetermined file system objects from the first virtual machine;

return a response to the first file system request to the first requestor via the set of HVFS APIs and the first set of HVFS drivers; and in response to the predetermined file system event, receive at a second set of HVFS drivers located in an operating system (OS) kernel of an operating system of the second virtual machine, from a second requestor, a second file system request, the second file system request relating to at least one of the predetermined file system objects from the second virtual machine;

send the second file system request to the HVFS manager via the set of HVFS APIs;

service the second file system request with the HVFS manager based on at least one of the following: a configuration or at least one source file system implementation of the at least one of the predetermined file system objects from the second virtual machine, the servicing comprising: translating the second file system request to a second storage device request, storing the at least one of the predetermined file system objects from the second virtual machine, and providing the anti-malware solution to the at least one of the predetermined file system objects from the second virtual machine; and return a response to the second file system request to the second requestor via the set of HVFS APIs and the second set of HVFS drivers.

* * * * *